United States Patent
Hagiwara (10) Patent No.: US 7,406,188 B2
(45) Date of Patent: Jul. 29, 2008

(54) DATA CORRECTION METHOD AND X-RAY CT APPARATUS

(75) Inventor: Akira Hagiwara, Tokyo (JP)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 520 days.

(21) Appl. No.: 11/013,216

(22) Filed: Dec. 15, 2004

(65) Prior Publication Data

US 2005/0135556 A1 Jun. 23, 2005

(30) Foreign Application Priority Data

Dec. 17, 2003 (JP) ............... 2003-419384

(51) Int. Cl.
G06K 9/00 (2006.01)
(52) U.S. Cl. ............... 382/131; 378/4; 378/19; 378/901
(58) Field of Classification Search ................. 382/128, 382/129, 130, 131, 132, 133, 134; 378/4, 378/16, 19, 21, 22, 23, 24, 25, 26, 27, 46, 378/63, 90, 92, 98.4, 98.6, 98.9, 98.11, 101, 378/140, 901; 600/407, 410, 411, 425; 250/363.04, 250/370.09
See application file for complete search history.

(56) References Cited

U.S. PATENT DOCUMENTS

| | | | |
|---|---|---|---|
| 4,670,840 A * | 6/1987 | Freundlich | ...................... 378/7 |
| 5,533,081 A | 7/1996 | Hsieh | |
| 5,615,279 A * | 3/1997 | Yoshioka et al. | ............. 382/131 |
| 5,933,540 A | 8/1999 | Lakshminarayanan et al. | |
| 6,028,909 A * | 2/2000 | Zmora | .......................... 378/15 |
| 6,208,763 B1 | 3/2001 | Avinash | |
| 6,463,167 B1 | 10/2002 | Feldman et al. | |
| 6,556,720 B1 * | 4/2003 | Avinash | ....................... 382/260 |
| 6,625,249 B1 * | 9/2003 | Temkin et al. | .................. 378/4 |
| 6,693,669 B1 | 2/2004 | Wu et al. | |
| 6,765,982 B2 * | 7/2004 | Sembritzki | ...................... 378/4 |
| 6,801,646 B1 | 10/2004 | Pena et al. | |
| 6,819,734 B2 * | 11/2004 | Raupach | ......................... 378/4 |

FOREIGN PATENT DOCUMENTS

| | | |
|---|---|---|
| CN | 1504570 | 6/2004 |
| JP | 2000-005159 | 1/2000 |
| JP | 2002-341848 | 11/2002 |
| JP | 2003-274180 | 9/2003 |

OTHER PUBLICATIONS

CN1504570 Abstract.

* cited by examiner

Primary Examiner—Abolfazl Tabatabai
(74) Attorney, Agent, or Firm—Armstrong Teasdale LLP (57) ABSTRACT

A method for applying correction adapted to the shape of a subject to be imaged. The method includes applying edge enhancement to data D(r, v, c) of interest if the difference between the data D(r, v, c) of interest and data D(r, v+1, c) in a view adjacent to the view corresponding to the data D(r, v, c) is large, while smoothing is applied to the data D(r, v, c) of interest when the difference is small.

18 Claims, 11 Drawing Sheets

DATA CORRECTION METHOD AND X-RAY CT APPARATUS

CROSS REFERENCE TO RELATED APPLICATIONS

This application claims the benefit of Japanese Application No. 2003-419384 filed Dec. 17, 2003.

BACKGROUND OF THE INVENTION

The present invention relates to a data correction method and an X-ray CT (computer tomography) apparatus, and more particularly to a data correction method and an X-ray CT apparatus capable of applying correction adapted to the shape of a subject to be imaged.

There is known a conventional X-ray CT apparatus for: if data has a larger value than an upper threshold, applying smoothing to the data; if data has a smaller value than a lower threshold, taking the data as is; and if data has a value between the upper and lower thresholds, applying smoothing to the data, the degree of which smoothing is lower than that for the data of a larger value than the upper threshold, and becomes higher in proportion as the data has a larger value (for example, see Patent Document 1).

[Patent Document 1] Japanese Patent Application Laid Open No. 2000-5159.

In such a conventional X-ray CT apparatus, the degree of correction processing is changed simply according to the magnitude of data.

However, assuming that the shape of a subject to be imaged is so complex as to make one of data elements adjacent to each other in the view or channel direction have a larger value and the other have a smaller value, the technique as described above causes the degree of smoothing to be increased for one of the adjacent data elements and decreased for the other, which is unreasonable. That is, the conventional X-ray CT apparatus poses a problem that correction adapted to the shape of the subject to be imaged can sometimes not be applied.

SUMMARY OF THE INVENTION

It is therefore an object of the present invention to provide a data correction method and an X-ray CT apparatus capable of applying correction adapted to the shape of an subject to be imaged.

As used herein, the term "relative rotation" and the like include all of the following: for a subject to be imaged placed in between an X-ray tube and a detector, rotating at least one of the X-ray tube and detector around the subject to be imaged without rotating the subject to be imaged; rotating the subject to be imaged around its axis without rotating the X-ray tube and detector; and rotating the subject to be imaged around its axis and counter-rotating at least one of the X-ray tube and detector around the subject to be imaged.

Moreover, collection of data is done by one of techniques including an axial scan in which the X-ray tube and detector are not moved rectilinearly relative to the subject to be imaged and a helical scan in which they are rectilinearly moved relative to the subject to be imaged.

In its first aspect, the present invention provides a data correction method characterized in comprising: for a set of data collected while relatively rotating at least one of an X-ray tube and a detector around a subject to be imaged, differentiating the degree or method of correction processing in a view direction according to the magnitude of variation of the data in the view direction.

According to the data correction method of the first aspect, the degree or method of correction processing in the view direction is differentiated between a case in which the shape of the subject to be imaged is so complex in the view direction as to make one of data elements adjacent to each other in the view direction have a larger value and the other have a smaller value, and a case in which the shape of the subject to be imaged is simple in the view direction to make data elements adjacent to each other in the view direction have values of the same magnitude. That is, correction adapted to the shape of the subject to be imaged can be achieved.

In its second aspect, the present invention provides a data correction method characterized in comprising: for a set of data collected while relatively rotating at least one of an X-ray tube and a detector around a subject to be imaged, differentiating the degree or method of correction processing in a channel direction according to the magnitude of variation of the data in the channel direction.

According to the data correction method of the second aspect, the degree or method of correction processing in the channel direction is differentiated between a case in which the shape of the subject to be imaged is so complex in the channel direction as to make one of data elements adjacent to each other in the channel direction have a larger value and the other have a smaller value, and a case in which the shape of the subject to be imaged is simple in the channel direction to make data elements adjacent to each other in the channel direction have values of the same magnitude. That is, correction adapted to the shape of the subject to be imaged can be achieved.

In its third aspect, the present invention provides a data correction method characterized in comprising: for a set of data collected while relatively rotating at least one of an X-ray tube and a multi-row detector around a subject to be imaged, differentiating the degree or method of correction processing in a detector row direction according to the magnitude of variation of the data in the detector row direction.

According to the data correction method of the third aspect, the degree or method of correction processing in the detector row direction is differentiated between a case in which the shape of the subject to be imaged is so complex in the detector row direction as to make one of data elements adjacent to each other in the detector row direction have a larger value and the other have a smaller value, and a case in which the shape of the subject to be imaged is simple in the detector row direction to make data elements adjacent to each other in the detector row direction have values of the same magnitude. That is, correction adapted to the shape of the subject to be imaged can be achieved.

In its fourth aspect, the present invention provides a data correction method characterized in comprising: for a set of data collected while relatively rotating at least one of an X-ray tube and a detector around a subject to be imaged, applying correction processing in a view direction in a range in which variation of the data in the view direction is larger, and applying no correction processing in the view direction in a range in which said variation of the data is smaller.

According to the data correction method of the fourth aspect, correction processing is applied in a case in which the shape of the subject to be imaged is so complex in the view direction as to make one of data elements adjacent to each other in the view direction have a larger value and the other have a smaller value, and no correction processing is applied in a case in which the shape of the subject to be imaged is simple in the view direction to make data elements adjacent to each other in the view direction have values of the same magnitude. That is, correction adapted to the shape of the subject to be imaged can be selectively achieved.

In its fifth aspect, the present invention provides a data correction method characterized in comprising: for a set of data collected while relatively rotating at least one of an X-ray tube and a detector around a subject to be imaged, applying correction processing in a channel direction in a range in which variation of the data in the channel direction is larger, and applying no correction processing in the channel direction in a range in which said variation of the data is smaller.

According to the data correction method of the fifth aspect, correction processing is applied in a case in which the shape of the subject to be imaged is so complex in the channel direction as to make one of data elements adjacent to each other in the channel direction have a larger value and the other have a smaller value, and no correction processing is applied in a case in which the shape of the subject to be imaged is simple in the channel direction to make data elements adjacent to each other in the channel direction have values of the same magnitude. That is, correction adapted to the shape of the subject to be imaged can be selectively achieved.

In its sixth aspect, the present invention provides a data correction method characterized in comprising: for a set of data collected while relatively rotating at least one of an X-ray tube and a multi-row detector around a subject to be imaged, applying correction processing in a detector row direction in a range in which variation of the data in the detector row direction is larger, and applying no correction processing in the detector row direction in a range in which said variation of the data is smaller.

According to the data correction method of the sixth aspect, correction processing is applied in a case in which the shape of the subject to be imaged is so complex in the detector row direction as to make one of data elements adjacent to each other in the detector row direction have a larger value and the other have a smaller value, and no correction processing is applied in a case in which the shape of the subject to be imaged is simple in the detector row direction to make data elements adjacent to each other in the detector row direction have values of the same magnitude. That is, correction adapted to the shape of the subject to be imaged can be selectively achieved.

In its seventh aspect, the present invention provides the data correction method having the aforementioned configuration, characterized in comprising: increasing the degree of said correction processing in proportion as said variation of the data is larger.

According to the data correction method of the seventh aspect, the degree of correction processing is increased for a more complex shape of the subject to be imaged. That is, correction at a degree adapted to the shape of the subject to be imaged can be achieved.

In its eighth aspect, the present invention provides the data correction method having the aforementioned configuration, characterized in that: said correction processing is edge enhancement.

According to the data correction method of the eighth aspect, spatial resolution is improved through edge enhancement for a complex shape of the subject to be imaged. On the other hand, no edge enhancement or a lower degree of edge enhancement is applied to prevent exaggeration of noise for a simple shape of the subject to be imaged.

In its ninth aspect, the present invention provides a data correction method characterized in comprising: for a set of data collected while relatively rotating at least one of an X-ray tube and a detector around a subject to be imaged, applying correction processing in a view direction in a range in which variation of the data in the view direction is smaller, and applying no correction processing in the view direction in a range in which said variation of the data is larger.

According to the data correction method of the ninth aspect, correction processing is applied in a case in which the shape of the subject to be imaged is simple in the view direction to make data elements adjacent to each other in the view direction have values of the same magnitude, and no correction processing is applied in a case in which the shape of the subject to be imaged is so complex in the view direction as to make one of data elements adjacent to each other in the view direction have a larger value and the other have a smaller value. That is, correction adapted to the shape of the subject to be imaged can be selectively achieved.

In its tenth aspect, the present invention provides a data correction method characterized in comprising: for a set of data collected while relatively rotating at least one of an X-ray tube and a detector around a subject to be imaged, applying correction processing in a channel direction in a range in which variation of the data in the channel direction is smaller, and applying no correction processing in the channel direction in a range in which said variation of the data is larger.

According to the data correction method of the tenth aspect, correction processing is applied in a case in which the shape of the subject to be imaged is simple in the channel direction to make data elements adjacent to each other in the channel direction have values of the same magnitude, and no correction processing is applied in a case in which the shape of the subject to be imaged is so complex in the channel direction as to make one of data elements adjacent to each other in the channel direction have a larger value and the other have a smaller value. That is, correction adapted to the shape of the subject to be imaged can be selectively achieved.

In its eleventh aspect, the present invention provides a data correction method characterized in comprising: for a set of data collected while relatively rotating at least one of an X-ray tube and a multi-row detector around a subject to be imaged, applying correction processing in a detector row direction in a range in which variation of the data in the detector row direction is smaller, and applying no correction processing in the detector row direction in a range in which said variation of the data is larger.

According to the data correction method of the eleventh aspect, correction processing is applied in a case in which the shape of the subject to be imaged is simple in the detector row direction to make data elements adjacent to each other in the detector row direction have values of the same magnitude, and no correction processing is applied in a case in which the shape of the subject to be imaged is so complex in the detector row direction as to make one of data elements adjacent to each other in the detector row direction have a larger value and the other have a smaller value. That is, correction adapted to the shape of the subject to be imaged can be selectively achieved.

In its twelfth aspect, the present invention provides the data correction method having the aforementioned configuration, characterized in comprising: increasing the degree of said correction processing in proportion as said variation of the data is smaller.

According to the data correction method of the twelfth aspect, the degree of correction processing is increased for a simpler shape of the subject to be imaged. That is, correction at a degree adapted to the shape of the subject to be imaged can be achieved.

In its thirteenth aspect, the present invention provides the data correction method having the aforementioned configuration, characterized in that: said correction processing is smoothing.

According to the data correction method of the thirteenth aspect, noise can be suppressed through smoothing for a simple shape of the subject to be imaged. On the other hand, no smoothing or a lower degree of smoothing is applied to prevent degradation of spatial resolution for a complex shape of the subject to be imaged.

In its fourteenth aspect, the present invention provides the data correction method having the aforementioned configuration, characterized in comprising: applying first correction processing in the view direction in a range in which said variation of the data is larger, and second correction processing in the view direction in a range in which said variation of the data is smaller.

According to the data correction method of the fourteenth aspect, first correction processing in the view direction is applied in a case in which the shape of the subject to be imaged is so complex in the view direction as to make one of data elements adjacent to each other in the view direction have a larger value and the other have a smaller value, and second correction processing in the view direction is applied in a case in which the shape of the subject to be imaged is simple in the view direction to make data elements adjacent to each other in the view direction have values of the same magnitude. That is, correction adapted to the shape of the subject to be imaged can be achieved.

In its fifteenth aspect, the present invention provides the data correction method having the aforementioned configuration, characterized in comprising: applying first correction processing in the channel direction in a range in which said variation of the data is larger, and second correction processing in the channel direction in a range in which said variation of the data is smaller.

According to the data correction method of the fifteenth aspect, first correction processing in the channel direction is applied in a case in which the shape of the subject to be imaged is so complex in the channel direction as to make one of data elements adjacent to each other in the channel direction have a larger value and the other have a smaller value, and second correction processing in the channel direction is applied in a case in which the shape of the subject to be imaged is simple in the channel direction to make data elements adjacent to each other in the channel direction have values of the same magnitude. That is, correction adapted to the shape of the subject to be imaged can be achieved.

In its sixteenth aspect, the present invention provides the data correction method having the aforementioned configuration, characterized in comprising: applying first correction processing in the detector row direction in a range in which said variation of the data is larger, and second correction processing in the detector row direction in a range in which said variation of the data is smaller.

According to the data correction method of the sixteenth aspect, first correction processing in the detector row direction is applied in a case in which the shape of the subject to be imaged is so complex in the detector row direction as to make one of data elements adjacent to each other in the detector row direction have a larger value and the other have a smaller value, and second correction processing in the detector row direction is applied in a case in which the shape of the subject to be imaged is simple in the detector row direction to make data elements adjacent to each other in the detector row direction have values of the same magnitude. That is, correction adapted to the shape of the subject to be imaged can be achieved.

In its seventeenth aspect, the present invention provides the data correction method having the aforementioned configuration, characterized in comprising: increasing the degree of the first correction processing in proportion as said variation of the data is larger, and increasing the degree of the second correction processing in proportion as said variation of the data is smaller.

According to the data correction method of the seventeenth aspect, the degree of the first correction processing is increased for a more complex shape of the subject to be imaged, and the degree of the second correction processing is increased for a simpler shape of the subject to be imaged. That is, correction by a method and at a degree adapted to the shape of the subject to be imaged can be achieved.

In its eighteenth aspect, the present invention provides the data correction method having the aforementioned configuration, characterized in that: said first correction processing is edge enhancement, and said second correction processing is smoothing.

According to the data correction method of the eighteenth aspect, edge enhancement is applied when the shape of the subject to be imaged is so complex as to make one of data elements adjacent to each other have a larger value and the other have a smaller value, thereby improving spatial resolution. On the other hand, smoothing is applied when the shape of the subject to be imaged is simple to make data elements adjacent to each other have values of the same magnitude, thereby suppressing noise.

In its nineteenth aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for correcting said data with the degree or method of correction processing in a view direction differentiated according to the magnitude of variation of the data in the view direction.

According to the X-ray CT apparatus of the nineteenth aspect, the data correction method of the first aspect is suitably implemented.

In its twentieth aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for correcting said data with the degree or method of correction processing in a channel direction differentiated according to the magnitude of variation of the data in the channel direction.

According to the X-ray CT apparatus of the twentieth aspect, the data correction method of the second aspect is suitably implemented.

In its twenty-first aspect, the present invention provides an X-ray CT apparatus characterized in comprising: an X-ray tube; a multi-row detector; scanning means for collecting a set of data while relatively rotating at least one of said X-ray tube and said multi-row detector around a subject to be imaged; and data correction processing means for correcting said data with the degree or method of correction processing in a detector row direction differentiated according to the magnitude of variation of the data in the detector row direction.

According to the X-ray CT apparatus of the twenty-first aspect, the data correction method of the third aspect is suitably implemented.

In its twenty-second aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for applying correction processing in a view direction in a range in which variation of the data in the view direction is larger, and applying no correction processing in the view direction in a range in which said variation of the data is smaller.

According to the X-ray CT apparatus of the twenty-second aspect, the data correction method of the fourth aspect is suitably implemented.

In its twenty-third aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for applying correction processing in a channel direction in a range in which variation of the data in the channel direction is larger, and applying no correction processing in the channel direction in a range in which said variation of the data is smaller.

According to the X-ray CT apparatus of the twenty-third aspect, the data correction method of the fifth aspect is suitably implemented.

In its twenty-fourth aspect, the present invention provides an X-ray CT apparatus characterized in comprising: an X-ray tube; a multi-row detector; scanning means for collecting a set of data while relatively rotating at least one of said X-ray tube and said multi-row detector around a subject to be imaged; and data correction processing means for applying correction processing in a detector row direction in a range in which variation of the data in the detector row direction is larger, and applying no correction processing in the detector row direction in a range in which said variation of the data is smaller.

According to the X-ray CT apparatus of the twenty-fourth aspect, the data correction method of the sixth aspect is suitably implemented.

In its twenty-fifth aspect, the present invention provides the X-ray CT apparatus having the aforementioned configuration, characterized in that: said data correction processing means increases the degree of said correction processing in proportion as said variation of the data is larger.

According to the X-ray CT apparatus of the twenty-fifth aspect, the data correction method of the seventh aspect is suitably implemented.

In its twenty-sixth aspect, the present invention provides the X-ray CT apparatus having the aforementioned configuration, characterized in that: said correction processing is edge enhancement.

According to the X-ray CT apparatus of the twenty-sixth aspect, the data correction method of the eighth aspect is suitably implemented.

In its twenty-seventh aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for applying correction processing in a view direction in a range in which variation of the data in the view direction is smaller, and applying no correction processing in the view direction in a range in which said variation of the data is larger.

According to the X-ray CT apparatus of the twenty-seventh aspect, the data correction method of the ninth aspect is suitably implemented.

In its twenty-eighth aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for applying correction processing in a channel direction in a range in which variation of the data in the channel direction is smaller, and applying no correction processing in the channel direction in a range in which said variation of the data is larger.

According to the X-ray CT apparatus of the twenty-eighth aspect, the data correction method of the tenth aspect is suitably implemented.

In its twenty-ninth aspect, the present invention provides an X-ray CT apparatus characterized in comprising: an X-ray tube; a detector; scanning means for collecting a set of data while relatively rotating at least one of said X-ray tube and said detector around a subject to be imaged; and data correction processing means for applying correction processing in a detector row direction in a range in which variation of the data in the detector row direction is smaller, and applying no correction processing in the detector row direction in a range in which said variation of the data is larger.

According to the X-ray CT apparatus of the twenty-ninth aspect, the data correction method of the eleventh aspect is suitably implemented.

In its thirtieth aspect, the present invention provides the X-ray CT apparatus having the aforementioned configuration, characterized in that: said data correction processing means decreases the degree of said correction processing in proportion as said variation of the data is larger.

According to the X-ray CT apparatus of the thirtieth aspect, the data correction method of the twelfth aspect is suitably implemented.

In its thirty-first aspect, the present invention provides the X-ray CT apparatus having the aforementioned configuration, characterized in that: said correction processing is smoothing.

According to the X-ray CT apparatus of the thirty-first aspect, the data correction method of the thirteenth aspect is suitably implemented.

In its thirty-second aspect, the present invention provides the X-ray CT apparatus having the aforementioned configuration, characterized in that: said data correction processing means applies first correction processing in the view direction in a range in which said variation of the data is larger, and second correction processing in the view direction in a range in which said variation of the data is smaller.

According to the X-ray CT apparatus of the thirty-second aspect, the data correction method of the fourteenth aspect is suitably implemented.

In its thirty-third aspect, the present invention provides the X-ray CT apparatus having the aforementioned configuration, characterized in that: said data correction processing means applies first correction processing in the channel direction in a range in which said variation of the data is larger, and second correction processing in the channel direction in a range in which said variation of the data is smaller.

According to the X-ray CT apparatus of the thirty-third aspect, the data correction method of the fifteenth aspect is suitably implemented.

In its thirty-fourth aspect, the present invention provides the X-ray CT apparatus having the aforementioned configuration, characterized in that: said data correction processing means applies first correction processing in the detector row direction in a range in which said variation of the data is larger, and second correction processing in the detector row direction in a range in which said variation of the data is smaller.

According to the X-ray CT apparatus of the thirty-fourth aspect, the data correction method of the sixteenth aspect is suitably implemented.

In its thirty-fifth aspect, the present invention provides the X-ray CT apparatus having the aforementioned configuration, characterized in that: said data correction processing means increases the degree of the first correction processing in proportion as said variation of the data is larger, and increases the degree of the second correction processing in proportion as said variation of the data is smaller.

According to the X-ray CT apparatus of the thirty-fifth aspect, the data correction method of the seventeenth aspect is suitably implemented.

In its thirty-sixth aspect, the present invention provides the X-ray CT apparatus having the aforementioned configuration, characterized in that: said first correction processing is edge enhancement, and said second correction processing is smoothing.

According to the X-ray CT apparatus of the thirty-sixth aspect, the data correction method of the eighteenth aspect is suitably implemented.

It should be noted that in the present invention, two or more of the following may be simultaneously applied: correction processing in the view direction, channel direction and detector row direction.

Moreover, correction other than that in accordance with the present invention may be employed in combination. For example, correction on the magnitude of data may be employed in combination.

According to the data correction method and X-ray CT apparatus of the present invention, correction adapted to the shape of the subject to be imaged can be achieved.

The data correction method and X-ray CT apparatus of the present invention may be applied for improving image quality of a CT image.

Further objects and advantages of the present invention will be apparent from the following description of the preferred embodiments of the invention as illustrated in the accompanying drawings.

DETAILED DESCRIPTION OF THE INVENTION

The present invention will now be described in more detail with reference to embodiments shown in the accompanying drawings. It should be noted that the present invention is not limited to the embodiments.

EXAMPLE 1

Figure 1:
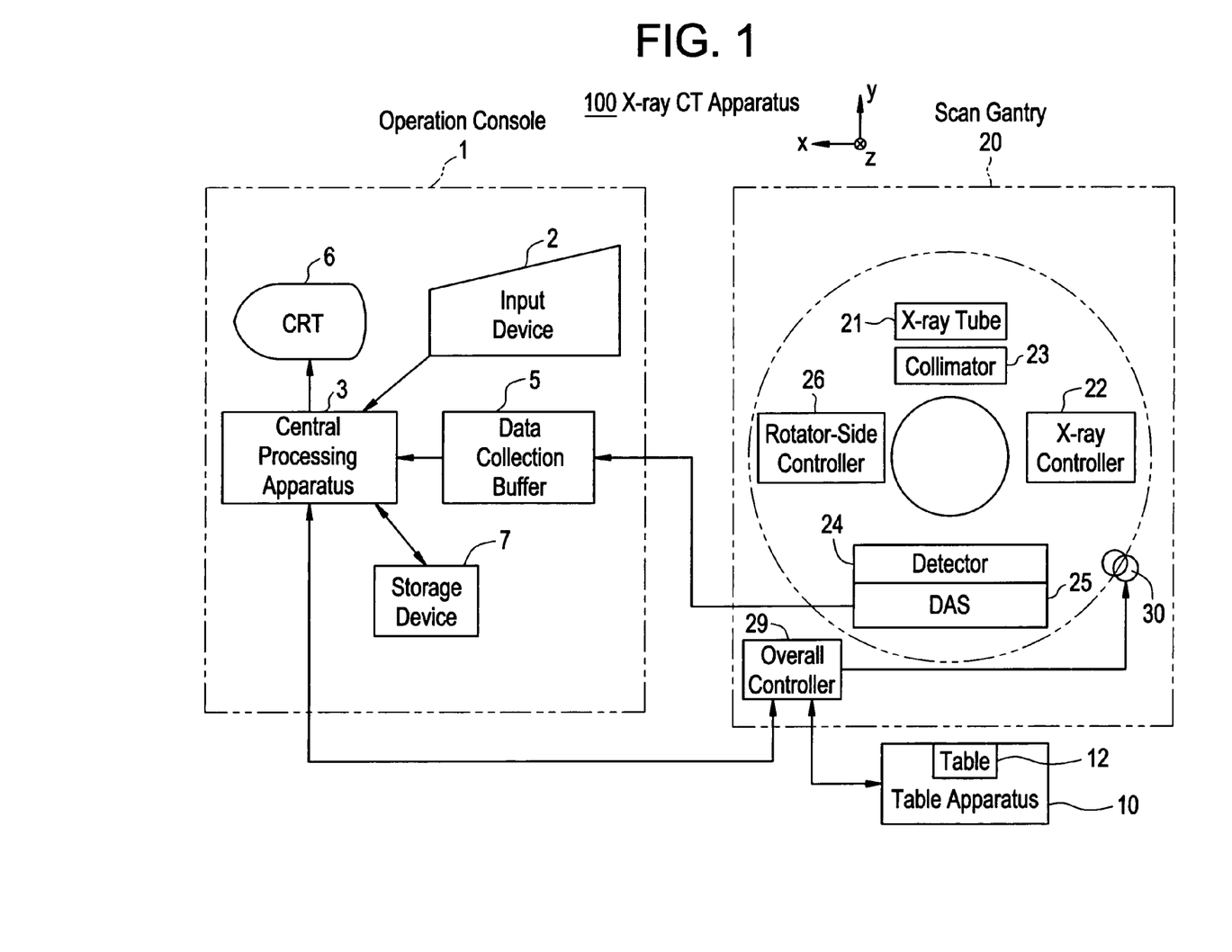
FIG. 1 is a configuration diagram showing an X-ray CT apparatus in accordance with Example 1.

FIG. 1 is a configuration diagram showing an X-ray CT apparatus 100 in accordance with Example 1.

The X-ray CT apparatus 100 comprises an operation console 1, a table apparatus 10, and a scan gantry 20.

The operation console 1 comprises an input device 2 for accepting inputs by a human operator, a central processing apparatus 3 for executing data collection processing, data correction processing, image reconstruction processing, and the like, a data collection buffer 5 for collecting data acquired at the scan gantry 20, a CRT 6 for displaying a CT image reconstructed from the data, and a storage device 7 for storing programs, data, and X-ray CT images.

The table apparatus 10 comprises a table 12 for laying thereon a subject to be imaged and transporting the subject into/out of a bore (cavity portion) of the scan gantry 20. The table 12 is vertically and horizontally/rectilinearly moved by a motor incorporated in the table apparatus 10.

The scan gantry 20 comprises an X-ray tube 21, an X-ray controller 22, a collimator 23, a detector 24, a DAS (data acquisition system) 25, a rotator-side controller 26 for controlling the X-ray controller 22, collimator 23 and DAS 25, an overall controller 29 for communicating control signals etc. with the operation console 1 and imaging table 10, and a slip ring 30.

While a multi-row detector is assumed as the detector 24 here, the detector 24 may be a single-row detector.

Figure 2:
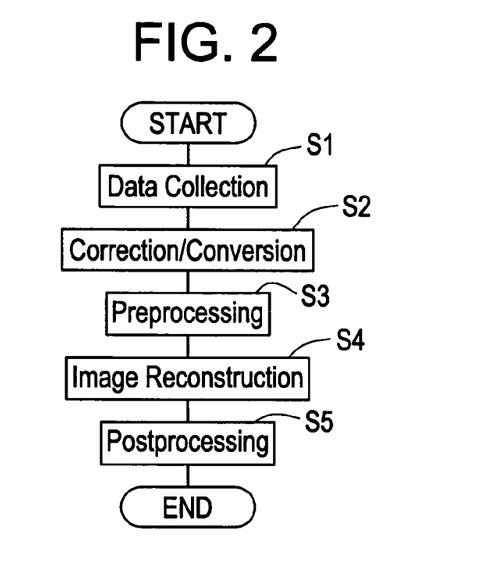
FIG. 2 is a flow chart showing the general operation of the X-ray CT apparatus in accordance with Example 1.

FIG. 2 is a flow chart showing the general operation of the X-ray CT apparatus 100.

At Step S1, data $D(z, r, \theta, c)$ represented by a rectilinear motion position z, a detector row index r, a fan angle $\theta$, and a channel index c are collected while rotating the X-ray tube 21 and detector 24 around the subject to be imaged.

Figure 3:
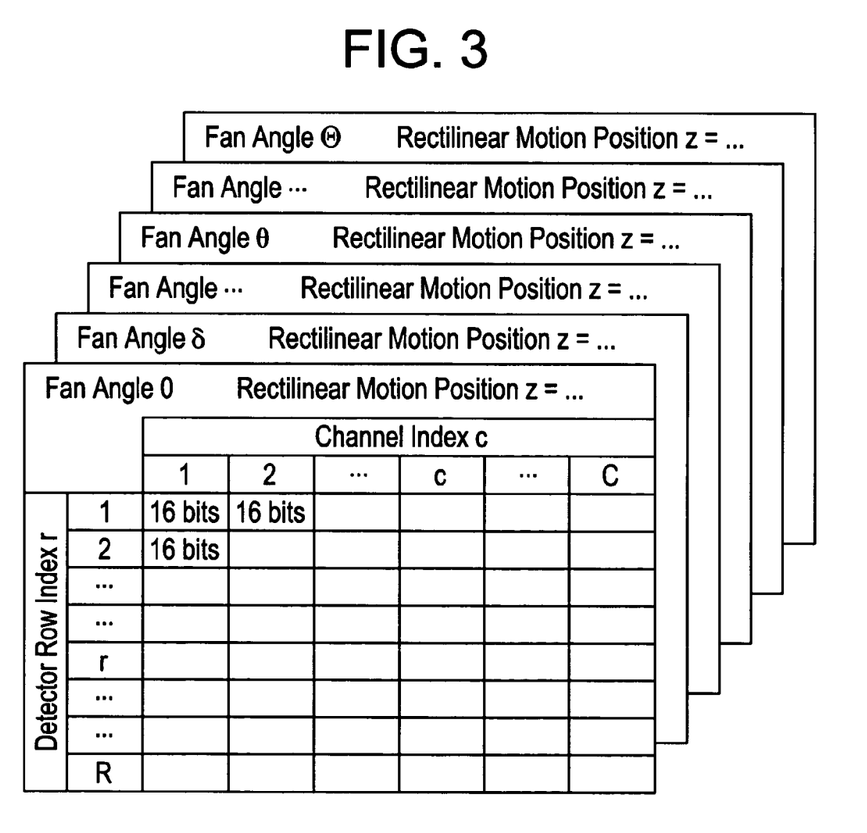
FIG. 3 is a conceptual diagram of collected data set.

FIG. 3 shows the collected data $D(z, r, \theta, c)$.

The rectilinear motion position z is detected by an encoder in the table apparatus 10, and it is constant in an axial scan while it varies in a helical scan. An axial scan is assumed here.

The detector row index r(=1, 2, . . . , R) is a sequential number given to the detector rows, and R≧2 for a multi-row detector, and R=1 for a single-row detector.

The fan angle θ(=0, δ, . . . , Θ) is an angle formed by the centerline of a fan beam with respect to a vertical axis, i.e., y-axis, and θ=0 when the centerline of a fan beam is parallel to the vertical axis i.e., y-axis, and the X-ray tube 21 lies on the upper side.

The channel index c(=1, 2, . . . , C) is a sequential number given to the channels in each detector row.

Referring again to FIG. 2, at Step S2, the collected data set is subjected to data correction processing in the detector row direction (FIG. 4) and data correction processing in the channel direction (FIG. 7), which will be described in detail later, and then to fan-parallel conversion.

At Step S3, the data set is subjected to pre-processing (offset correction, log correction, X-ray dose correction, sensitivity correction, etc.).

At Step S4, the data set is subjected to image reconstruction to produce a CT image.

At Step S5, the produced CT image is subjected to post-processing for display.

Figure 4:
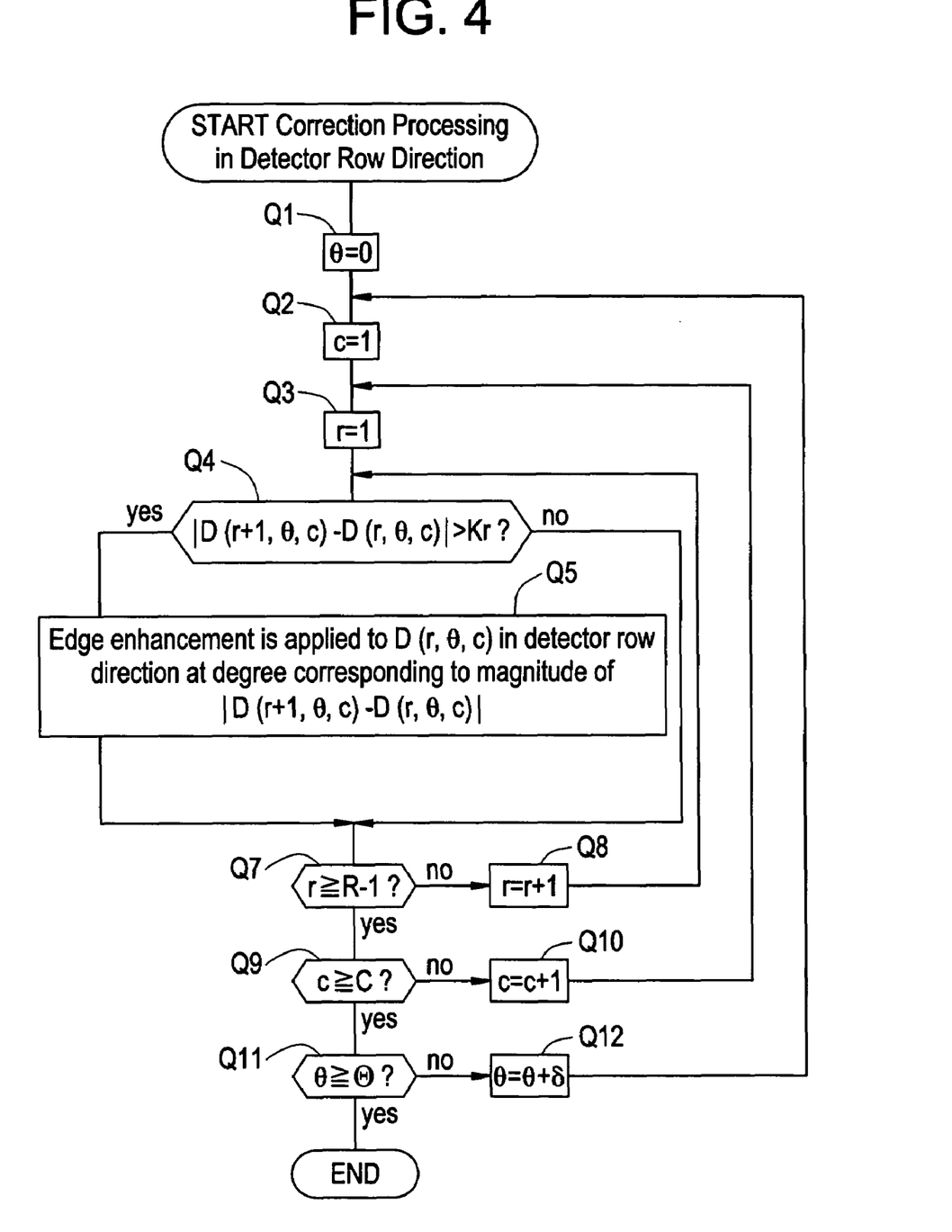
FIG. 4 is a flow chart showing data correction processing in the detector row direction in accordance with Example 1.

FIG. 4 is a flow chart showing details of data correction processing in the detector row direction.

At Step Q1, the fan angle θ is initialized as θ=0.
At Step Q2, the channel index c is initialized as c=1.
At Step Q3, the detector row index r is initialized as r=1.

At Step Q4, if the difference between data D(r, θ, c) of interest and data D(r+1, θ, c) at a detector row adjacent to the detector row corresponding to the data D(r, θ, c) is greater than a threshold Kr (empirically determined), the process goes to Step Q5; otherwise to Step Q7.

Figure 5:
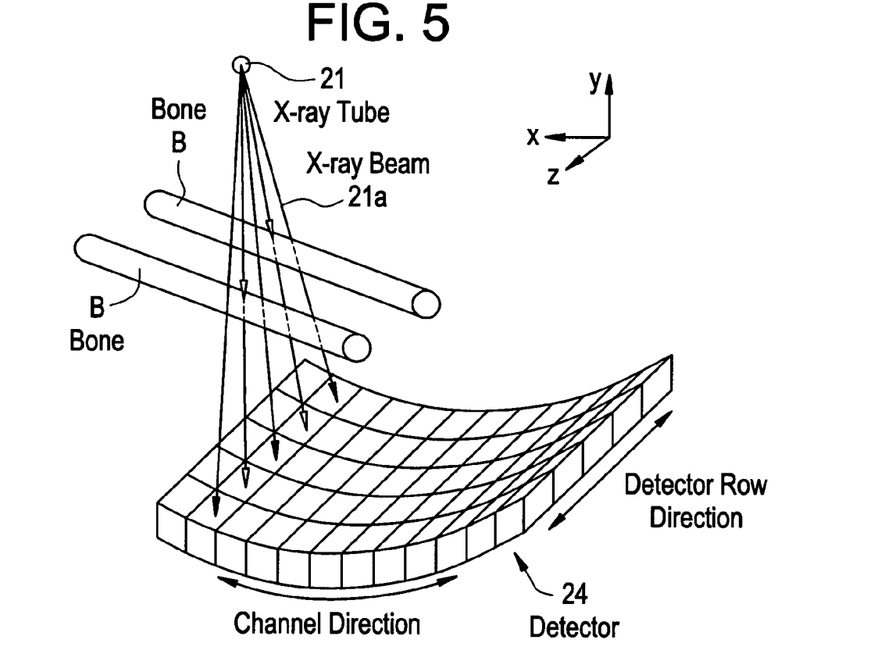
FIG. 5 is an explanatory diagram showing a case in which the shape of the subject to be imaged is complex in the detector row direction.
Figure 6:
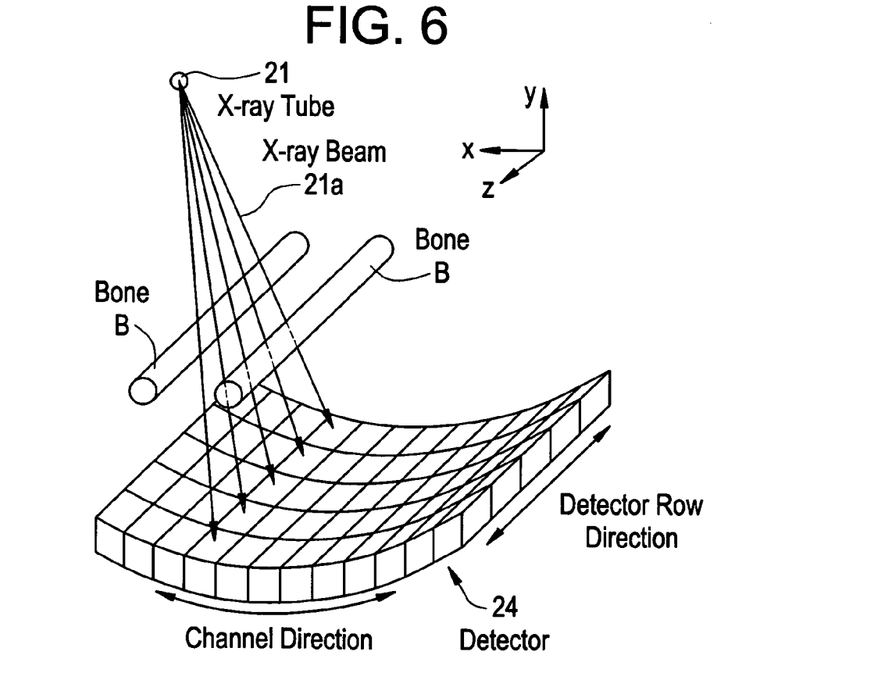
FIG. 6 is an explanatory diagram showing a case in which the shape of the subject to be imaged is simple in the detector row direction.

For example, if bones B extend in the channel direction and intercept an X-ray beam 21 a that otherwise impinges upon detector rows separated by one detector row as shown in FIG. 5, the difference between the data D(r, θ, c) of interest and the data D(r+1, θ, c) at a detector row adjacent to the detector row corresponding to the data D(r, θ, c) is greater than the threshold Kr, and accordingly the process goes to Step Q5. On the other hand, if bones B extend in the detector row direction and cause no difference in the X-ray beam 21a that impinges upon adjacent detector rows as shown in FIG. 6, the difference between the data D(r, θ, c) of interest and the data D(r+1, θ, c) at a detector row adjacent to the detector row corresponding to the data D(r, θ, c) is not greater than the threshold Kr, and accordingly the process goes to Step Q7.

At Step Q5, edge enhancement is applied to the data D(r, θ, c) of interest in the detector row direction so that the degree of enhancement is increased for a larger difference between the data D(r, θ, c) of interest and the data D(r+1, θ, c) at a detector row adjacent to the detector row corresponding to the data D(r, θ, c). The process then goes to Step Q7.

At Step Q7, if the detector row index r is not r≧R−1, the process goes to Step Q8; otherwise, goes to Step Q9.

At Step Q8, the detector row index r is incremented by one, and the process goes back to Step Q4.

At Step Q9, if the channel index c is not c≧C, the process goes to Step Q10; otherwise, goes to Step Q11.

At Step Q10, the channel index c is incremented by one, and the process goes back to Step Q3.

At Step Q11, if the fan angle θ is not θ≧Θ, the process goes to Step Q12; otherwise, the process is terminated.

At Step Q12, the fan angle θ is incremented by δ, and the process goes back to Step Q2.

Figure 7:
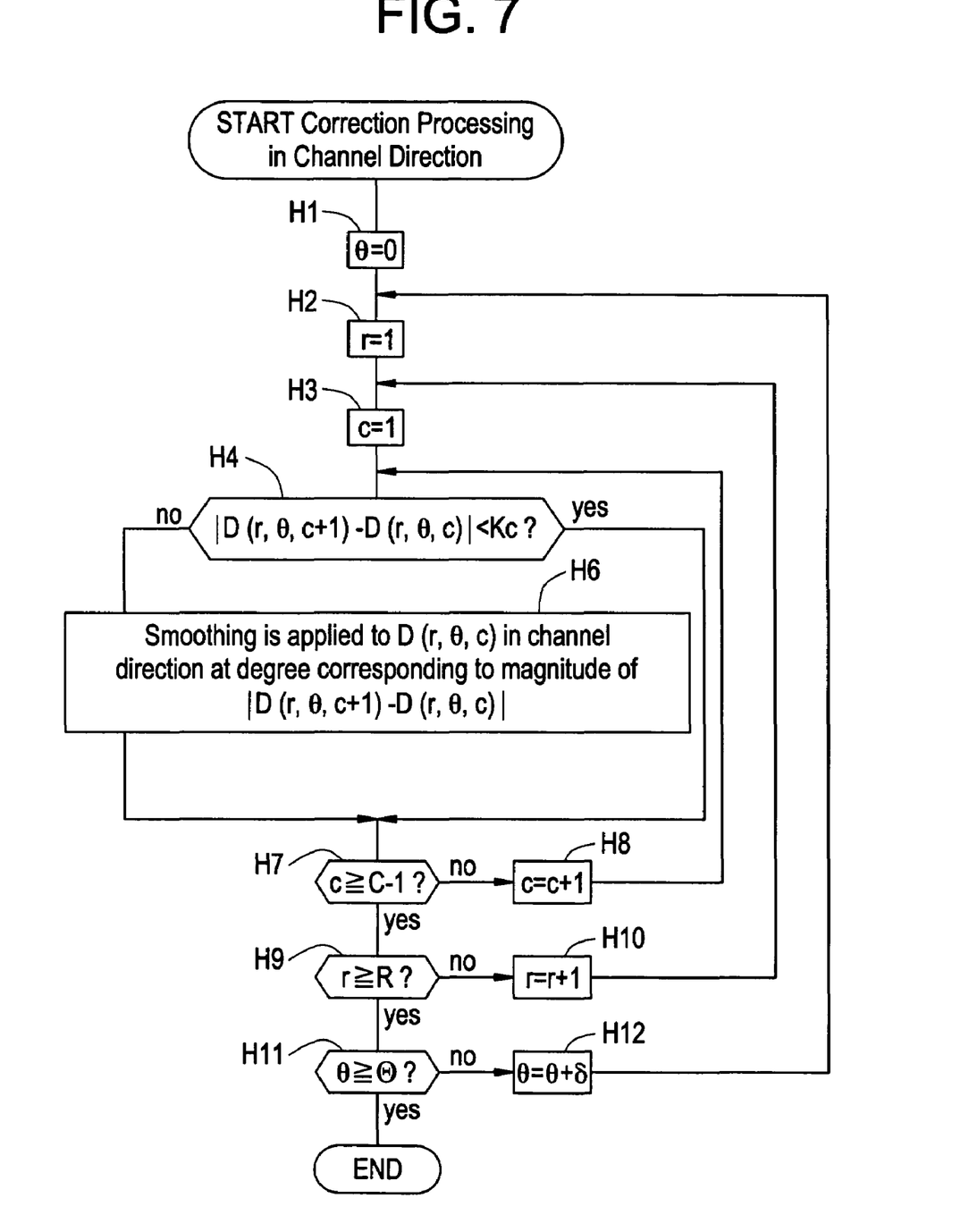
FIG. 7 is a flow chart showing data correction processing in the channel direction in accordance with Example 1.

FIG. 7 is a flow chart showing details of data correction processing in the channel direction.

At Step H1, the fan angle θ is initialized as θ=0.
At Step H2, the detector row index r is initialized as r=1.
At Step H3, the channel index c is initialized as c=1.

At Step H4, if the difference between data D(r, θ, c) of interest and data D(r, θ, c+1) at a channel adjacent to the channel corresponding to the data D(r, θ, c) is smaller than a threshold Kc (empirically determined), the process goes to Step H6; otherwise to Step H7.

Figure 8:
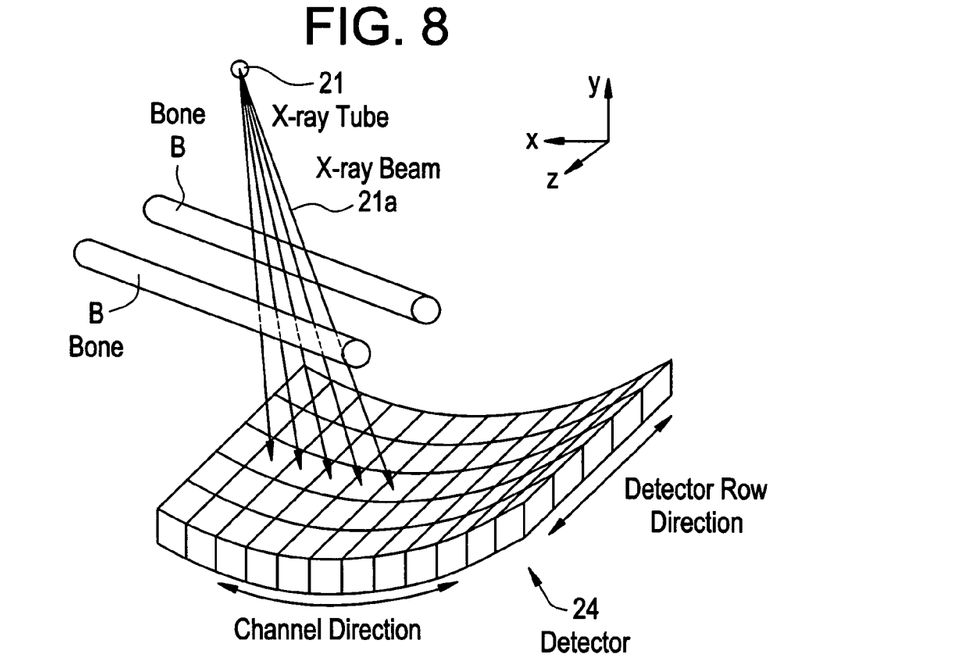
FIG. 8 is an explanatory diagram showing a case in which the shape of the subject to be imaged is simple in the channel direction.
Figure 9:
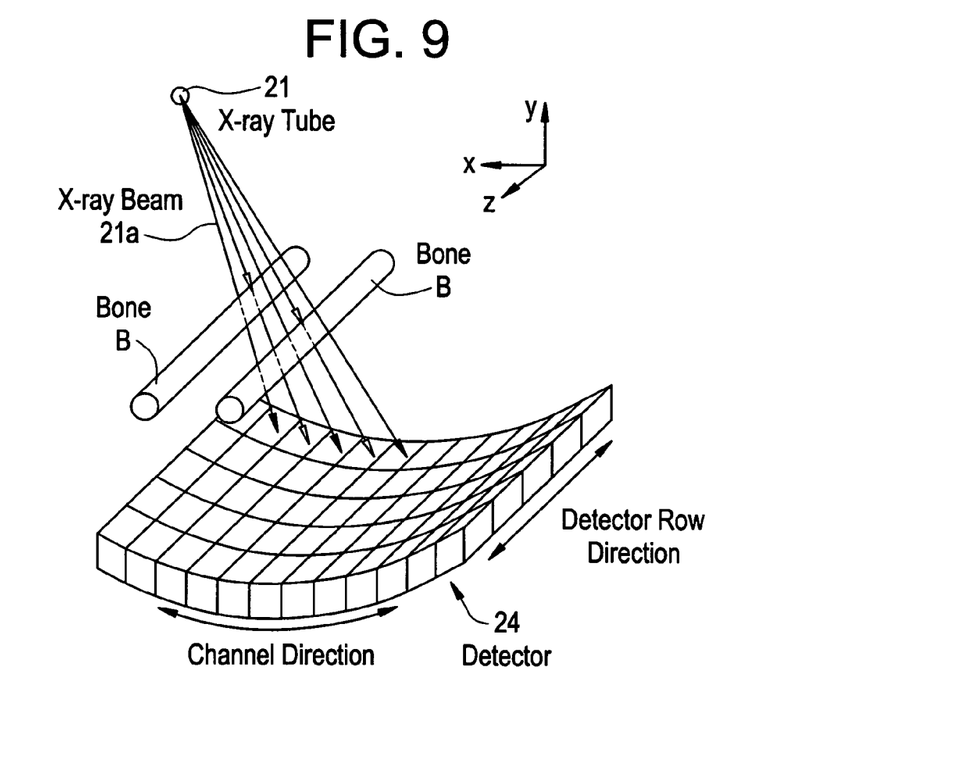
FIG. 9 is an explanatory diagram showing a case in which the shape of the subject to be imaged is complex in the channel direction.

For example, if bones B extend in the channel direction and cause no difference in an X-ray beam 21a that impinges upon adjacent channels as shown in FIG. 8, the difference between the data D(r, θ, c) of interest and the data D(r, θ, c+1) at a channel adjacent to the channel corresponding to the data D(r, θ, c) is smaller than the threshold Kc, and accordingly the process goes to Step H6. On the other hand, if bones B extend in the detector row direction and intercept the X-ray beam 21 a that otherwise impinges upon channels separated by one channel as shown in FIG. 9, the difference between the data D(r, θ, c) of interest and the data D(r, θ, c+1) at a channel adjacent to the channel corresponding to the data D(r, θ, c) is not smaller than the threshold Kc, and accordingly the process goes to Step H7.

At Step H6, smoothing is applied to the data D(r, θ, c) of interest in the channel direction so that the degree of smoothing is increased for a smaller difference between the data D(r, θ, c) of interest and the data D(r, θ, c+1) at a channel adjacent to the channel corresponding to the data D(r, θ, c). The process then goes to Step H7.

At Step H7, if the channel index c is not c≧C−1, the process goes to Step H8; otherwise, goes to Step H9.

At Step H8, the channel index c is incremented by one, and the process goes back to Step H4.

At Step H9, if the detector row index r is not r≧R, the process goes to Step H10; otherwise, to Step H11.

At Step H10, the detector row index r is incremented by one, and the process goes back to Step H3.

At Step H11, if the fan angle θ is not θ≧Θ, the process goes to Step H12; otherwise, the process is terminated.

At Step H12, the fan angle θ is incremented by δ, and the process goes back to Step H2.

According to the X-ray CT apparatus 100 of Example 1, edge enhancement is applied when the shape of the subject to be imaged is complex in the detector row direction, thereby improving spatial resolution. On the other hand, no edge enhancement is applied when the shape of the subject to be imaged is simple in the detector row direction, thus preventing exaggeration of noise. Moreover, since smoothing is applied when the shape of the subject to be imaged is simple in the channel direction, noise can be suppressed. On the other hand, no smoothing is applied when the shape of the subject to be imaged is complex in the channel direction, preventing degeneration of spatial resolution.

EXAMPLE 2

Figure 14:
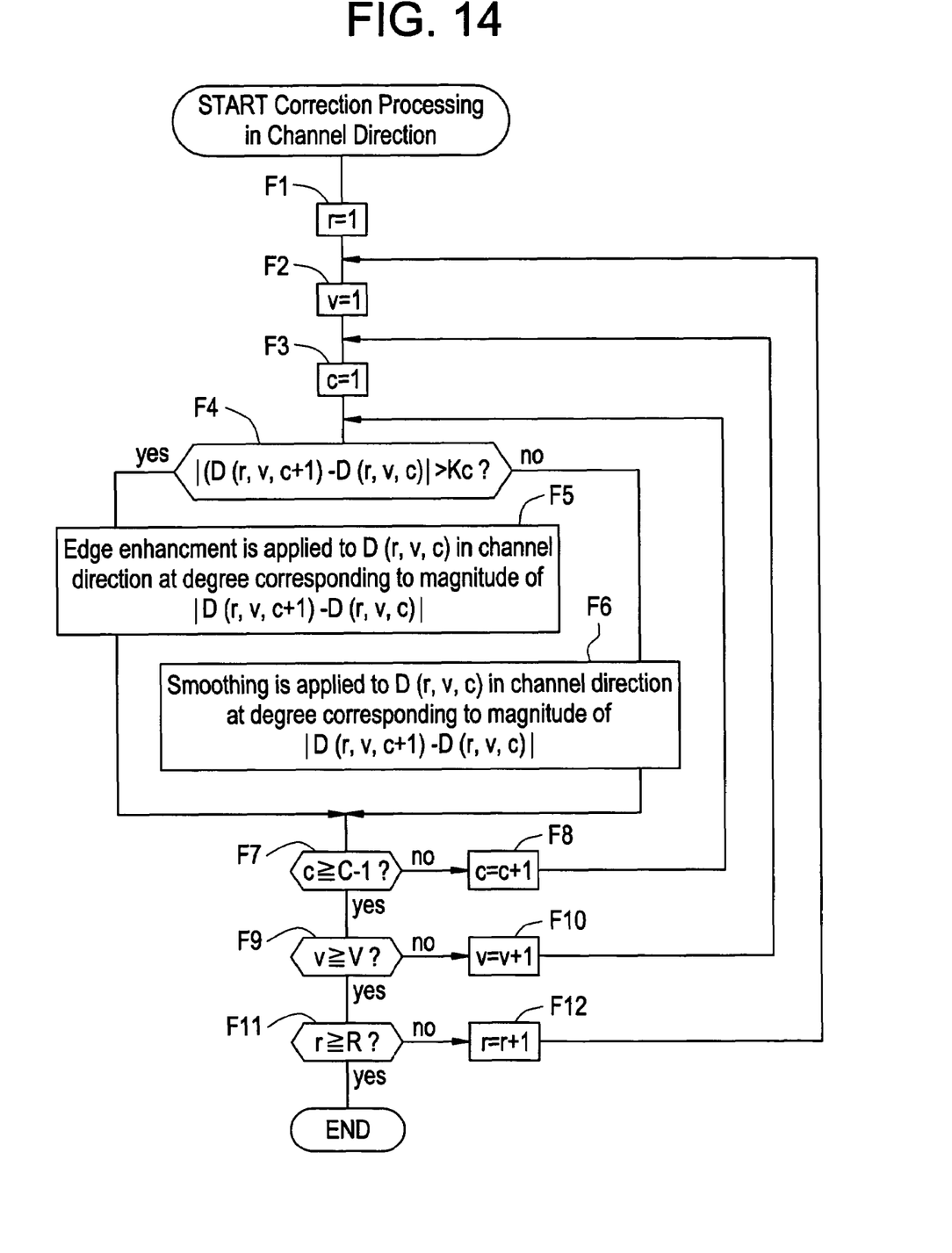
FIG. 14 is a flow chart showing data correction processing in the channel direction in accordance with Example 2.

In Example 2, the data set collected at Step S1 in FIG. 2 is subjected to fan-parallel conversion at Step S2, and then to data correction processing in the view direction (FIG. 11) and data correction processing in the channel direction (FIG. 14).

Figure 10:
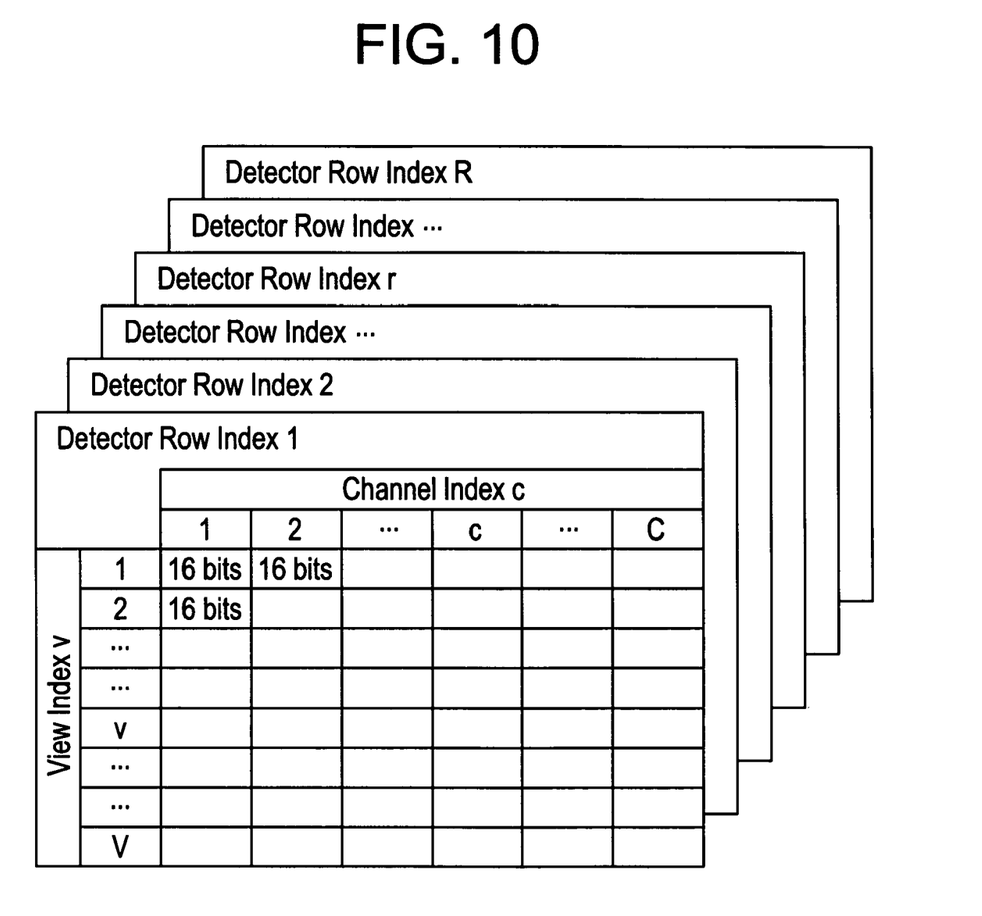
FIG. 10 is a conceptual diagram of a data set after fan-parallel conversion.

FIG. 10 shows a data set after fan-parallel conversion.

The view index v (=1, 2, . . . , V) is a sequential number given to the angle formed by an X-ray beam with respect to a vertical axis, i.e., y-axis.

Figure 11:
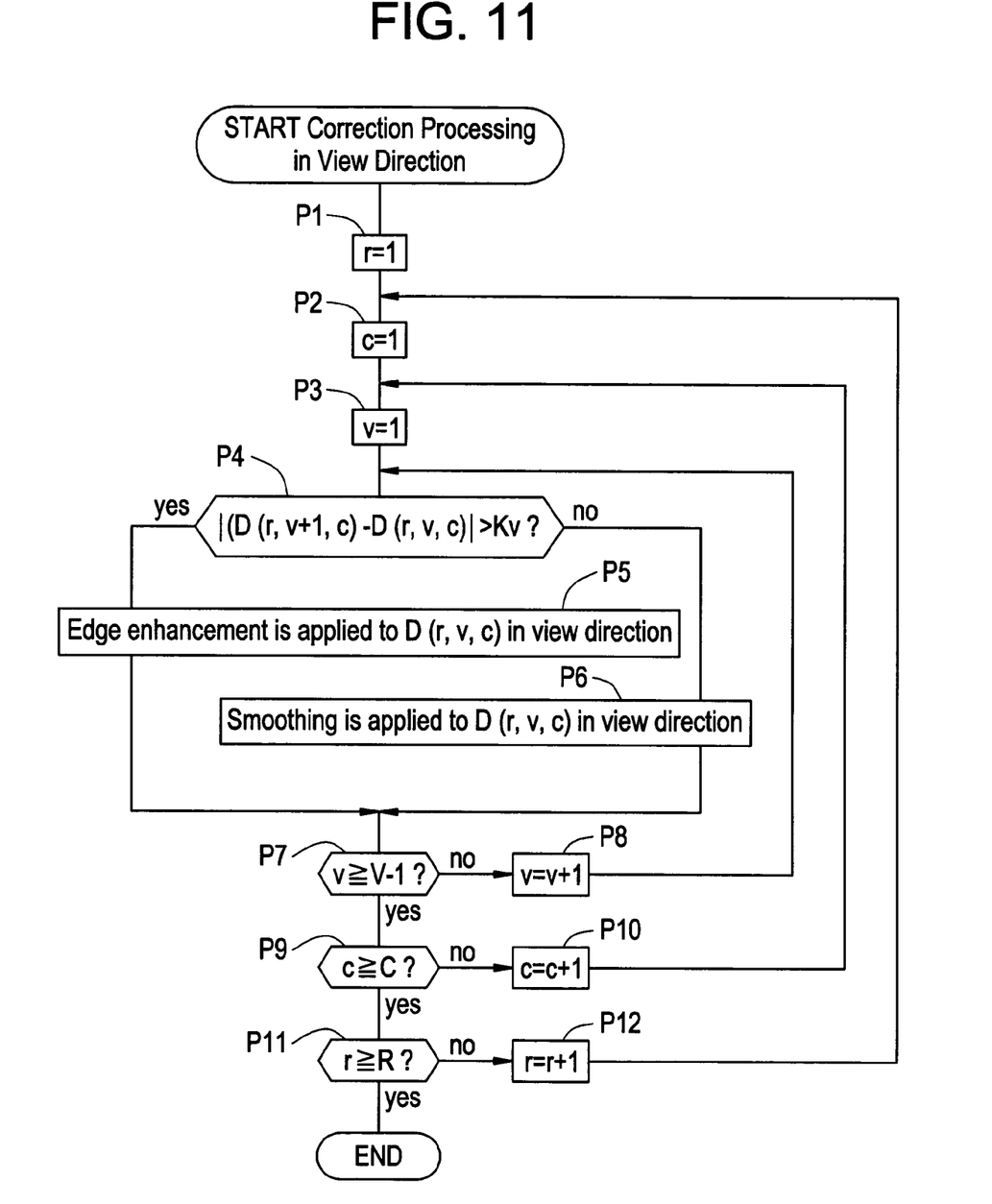
FIG. 11 is a flow chart showing data correction processing in the view direction in accordance with Example 2.

FIG. 11 is a flow chart showing details of data correction processing in the detector row direction.

At Step P1, the detector row angle r is initialized as r=1.

At Step P2, the channel index c is initialized as c=1.

At Step P3, the view index v is initialized as v=1.

At Step P4, if the difference between data D(r, v, c) of interest and data D(r, v+1, c) at a view adjacent to the view corresponding to the data D(r, v, c) is greater than a threshold Kv (empirically determined), the process goes to Step P5; otherwise to Step P6.

Figure 12:
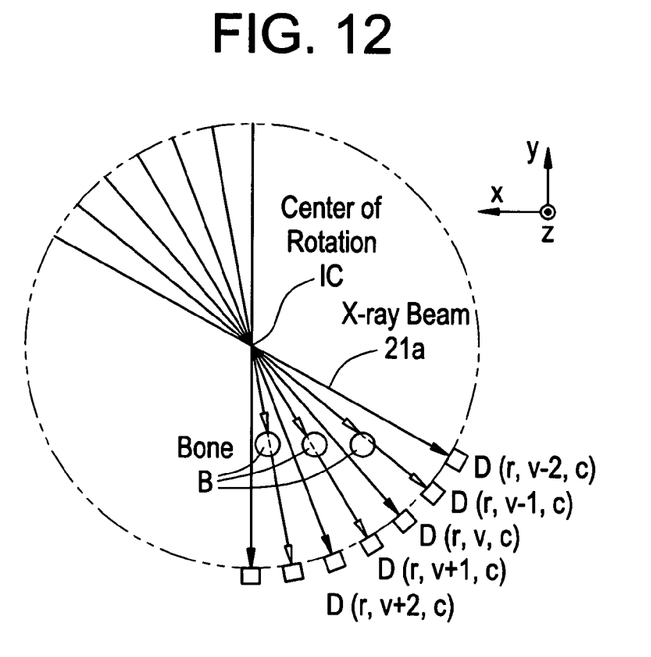
FIG. 12 is an explanatory diagram showing a case in which the shape of the subject to be imaged is complex in the rotation direction.
Figure 13:
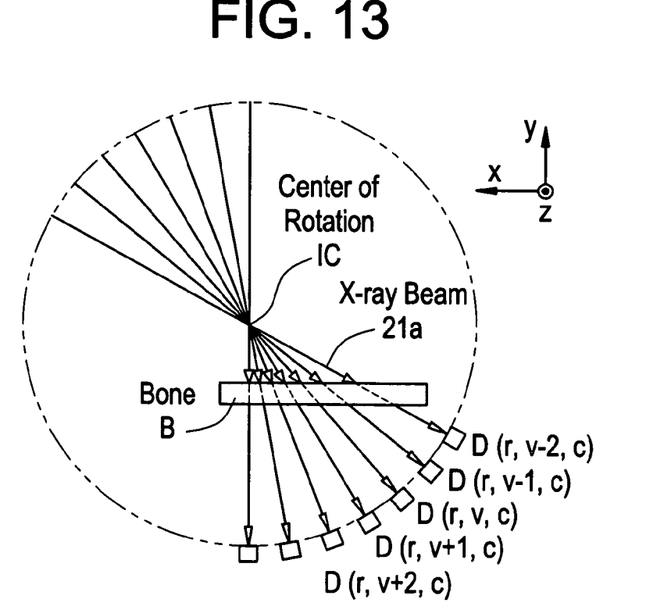
FIG. 13 is an explanatory diagram showing a case in which the shape of the subject to be imaged is simple in the rotation direction.

For example, if bones B lie side by side in the rotation direction and intercept an X-ray beam 21a that otherwise impinges upon views separated by one view as shown in FIG. 12, the difference between the data D(r, v, c) of interest and the data D(r, v+1, c) at a view adjacent to the view corresponding to the data D(r, v, c) is greater than the threshold Kv, and accordingly the process goes to Step P5. On the other hand, if a bone B extends in the rotation direction and causes no difference in the X-ray beam 21a that impinges upon adjacent views as shown in FIG. 13, the difference between the data D(r, v, c) of interest and the data D(r, v+1, c) at a view adjacent to the view corresponding to the data D(r, v, c) is not greater than the threshold Kv, and accordingly the process goes to Step P6.

At Step P5, edge enhancement is applied to the data D(r, v, c) of interest in the view direction. The process then goes to Step P7.

At Step P6, smoothing is applied to the data D(r, v, c) of interest in the view direction. The process then goes to Step P7.

At Step P7, if the view index v is not v≧V−1, the process goes to Step P8; otherwise, to Step P9.

At Step P8, the view index v is incremented by one, and the process goes back to Step P4.

At Step P9, if the channel index c is not c≧C, the process goes to Step P10; otherwise, to Step P11.

At Step P10, the channel index c is incremented by one, and the process goes back to Step P3.

At Step P11, if the detector row index r is not r≧R, the process goes to Step P12; otherwise, the process is terminated.

At Step P12, the detector row index r is incremented by one, and the process goes back to Step P2.

FIG. 14 is a flow chart showing details of data correction processing in the channel direction.

At Step F1, the detector row index r is initialized as r=1.

At Step F2, the view index v is initialized as v=1.

At Step F3, the channel index c is initialized as c=1.

At Step F4, if the difference between data D(r, v, c) of interest and data D(r, v, c+1) of a channel adjacent to the channel corresponding to the data D(r, v, c) is greater than a threshold Kc (empirically determined), the process goes to Step F5; otherwise, to Step F6.

Figure 15:
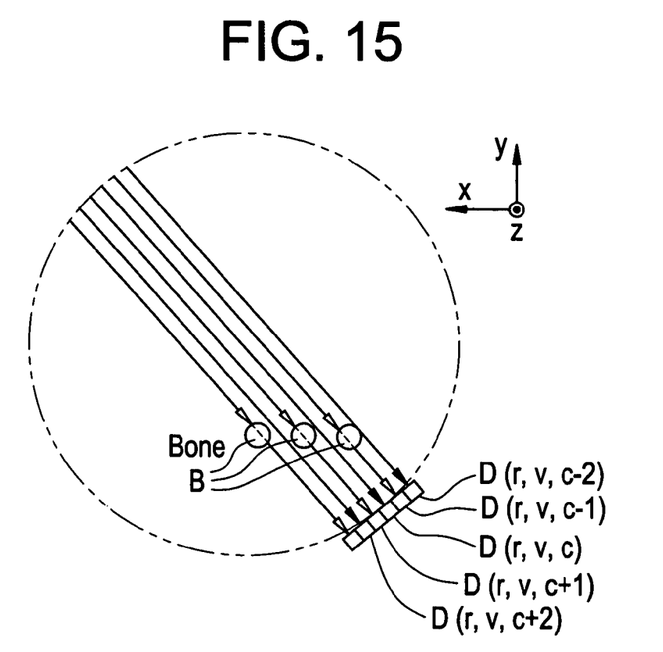
FIG. 15 is an explanatory diagram showing a case in which the shape of the subject to be imaged is complex in the channel direction.
Figure 16:
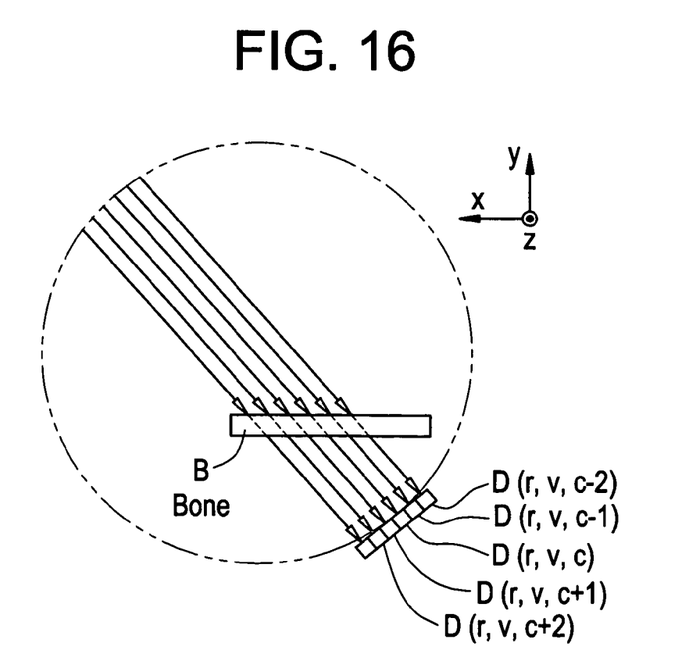
FIG. 16 is an explanatory diagram showing a case in which the shape of the subject to be imaged is simple in the channel direction.

For example, if bones B lie side by side in the detector row direction and intercept an X-ray beam 21a that otherwise impinges upon channels separated by one channel as shown in FIG. 15, the difference between the data D(r, v, c) of interest and the data D(r, v, c+1) at a channel adjacent to the channel corresponding to the data D(r, v, c) is greater than the threshold Kc, and accordingly the process goes to Step F5. On the other hand, if a bone B extends in the channel direction and causes no difference in the X-ray beam 21a that impinges upon adjacent channels as shown in FIG. 16, the difference between the data D(r, v, c) of interest and the data D(r, v, c+1) at a channel adjacent to the channel corresponding to the data D(r, v, c) is not greater than the threshold Kv, and accordingly the process goes to Step F6.

At Step F5, edge enhancement is applied to the data D(r, v, c) of interest in the view direction so that the degree of enhancement is increased for a larger difference between the data D(r, v, c) of interest and the data D(r, v, c+1) at a view adjacent to the view corresponding to the data D(r, v, c). The process then goes to Step F7.

At Step F6, smoothing is applied to the data D(r, v, c) of interest in the channel direction so that the degree of smoothing is increased for a smaller difference between the data D(r, v, c) of interest and the data D(r, v, c+1) at a channel adjacent to the channel corresponding to the data D(r, v, c). The process then goes to Step F7.

At Step F7, if the channel index c is not c≧C−1, the process goes to Step F8; otherwise, to Step F9.

At Step F8, the channel index c is incremented by one, and the process goes back to Step F4.

At Step F9, if the view index v is not v≧V, the process goes to Step F10; otherwise, to Step F11.

At Step F10, the view index v is incremented by one, and the process goes back to Step F3.

At Step F11, if the detector row index r is not r≧R, the process goes to Step F12; otherwise, the process is terminated.

At Step F12, the detector row index r is incremented by one, and the process goes back to Step F2.

According to the X-ray CT apparatus of Example 2, edge enhancement is applied when the shape of the subject to be imaged is complex in the view direction, thereby improving spatial resolution. On the other hand, since smoothing is applied when the shape of the subject to be imaged is simple in the view direction, noise can be suppressed. Moreover, edge enhancement is applied when the shape of the subject to be imaged is complex in the channel direction, thereby improving spatial resolution. On the other hand, since smoothing is applied when the shape of the subject to be imaged is simple in the channel direction, noise can be suppressed.

Many widely different embodiments of the invention may be configured without departing from the spirit and the scope of the present invention. It should be understood that the present invention is not limited to the specific embodiments described in the specification, except as defined in the appended claims.

The invention claimed is:

1. An X-ray CT apparatus comprising:
   an X-ray tube;
   a detector;
   a scanning device for collecting a set of data while relatively rotating at least one of said X-ray tube and said detector around a subject to be imaged; and
   a data correction processing device for correcting said data with a correction processing in a view direction differentiated according to a magnitude of variation of the data in the view direction to edge enhance the data when the magnitude of variation is greater than a predetermined threshold and smooth the data when the magnitude of variation is not greater than the predetermined threshold.

2. The X-ray CT apparatus of claim 1, wherein said data correction processing device applies edge enhancement as the correction processing in a range in which the variation of the data is greater than the predetermined threshold, and does not apply the correction processing in a range in which the variation of the data is not greater than the predetermined threshold.

3. The X-ray CT apparatus of claim 2, wherein said data correction processing device proportionally increases a degree of the edge enhancement as the variation of the data increases.

4. The X-ray CT apparatus of claim 1, wherein said data correction processing device applies smoothing as the correction processing in a range in which the variation of the data is not greater than the predetermined threshold, and does not apply the correction processing in a range in which the variation of the data is greater than the predetermined threshold.

5. The X-ray CT apparatus of claim 4, wherein said data correction processing device proportionally increases the degree of the smoothing as the variation of the data decreases.

6. The X-ray CT apparatus of claim 1, wherein said data correction processing device applies edge enhancement as the correction processing in a range in which the variation of the data is greater than the predetermined threshold, and applies smoothing as the correction processing in a range in which the variation of the data is not greater than the predetermined threshold.

7. An X-ray CT apparatus comprising:

an X-ray tube;

a detector;

a scanning device for collecting a set of data while relatively rotating at least one of said X-ray tube and said detector around a subject to be imaged; and a data correction processing device for correcting said data with a correction processing in a channel direction differentiated according to a magnitude of variation of the data in the channel direction to edge enhance the data when the magnitude of variation is greater than a predetermined threshold and smooth the data when the magnitude of variation is not greater than the predetermined threshold.

8. The X-ray CT apparatus of claim 7, wherein said data correction processing device applies edge enhancement as the correction processing in a range in which the variation of the data is greater than the predetermined threshold, and does not apply the correction processing in a range in which the variation of the data is not greater than the predetermined threshold.

9. The X-ray CT apparatus of claim 8, wherein said data correction processing device proportionally increases the degree of the edge enhancement as the variation of the data increases.

10. The X-ray CT apparatus of claim 7, wherein said data correction processing device applies smoothing as the correction processing in a range in which the variation of the data is not greater than the predetermined threshold, and does not apply the correction processing in a range in which the variation of the data is greater than the predetermined threshold.

11. The X-ray CT apparatus of claim 10, wherein said data correction processing device proportionally increases the degree of the edge enhancement as the variation of the data increases.

12. The X-ray CT apparatus of claim 7, wherein said data correction processing device applies edge enhancement as the correction processing in a range in which the variation of the data is greater than the predetermined threshold, and applies smoothing as the correction processing in a range in which the variation of the data is not greater than the predetermined threshold.

13. An X-ray CT apparatus comprising:

an X-ray tube;

a detector;

a scanning device for collecting a set of data while relatively rotating at least one of said X-ray tube and said detector around a subject to be imaged; and a data correction processing device for correcting data with a correction processing in a row direction differentiated according to a magnitude of variation of the data in the channel direction to edge enhance the data when the magnitude of variation is greater than a predetermined threshold and smooth the data when the magnitude of variation is not greater than the predetermined threshold.

14. The X-ray CT apparatus of claim 13, wherein said data correction processing device applies edge enhancement as the correction processing in a range in which the variation of the data is greater than the predetermined threshold, and does not apply the correction processing in a range in which the variation of the data is not greater than the predetermined threshold.

15. The X-ray CT apparatus of claim 14, wherein said data correction processing device proportionally increases the degree of the edge enhancement as the variation of the data increases.

16. The X-ray CT apparatus of claim 13, wherein said data correction processing device applies smoothing as the correction processing in a range in which the variation of the data is not greater than the predetermined threshold, and does not apply the correction processing in a range in which the variation of the data is greater than the predetermined threshold.

17. The X-ray CT apparatus of claim 16, wherein said data correction processing device proportionally increases the degree of the smoothing as the variation of the data decreases.

18. The X-ray CT apparatus of claim 17, wherein said data correction processing device applies edge enhancement as the correction processing in a range in which the variation of the data is greater than the predetermined threshold, and applies smoothing as the correction processing in a range in which the variation of the data is not greater than the predetermined threshold.

* * * * *